US009658789B2

(12) United States Patent
Erez

(10) Patent No.: US 9,658,789 B2
(45) Date of Patent: May 23, 2017

(54) STORAGE MODULE AND METHOD FOR OPTIMIZED POWER UTILIZATION

(71) Applicant: SanDisk Technologies Inc., Plano, TX (US)

(72) Inventor: Eran Erez, San Jose, CA (US)

(73) Assignee: SanDisk Technologies LLC, Plano, TX (US)

( * ) Notice: Subject to any disclaimer, the term of this patent is extended or adjusted under 35 U.S.C. 154(b) by 232 days.

(21) Appl. No.: 14/452,156

(22) Filed: Aug. 5, 2014

(65) Prior Publication Data

US 2016/0041786 A1 Feb. 11, 2016

(51) Int. Cl.
*G06F 1/32* (2006.01)
*G06F 3/06* (2006.01)

(52) U.S. Cl.
CPC .......... *G06F 3/0625* (2013.01); *G06F 1/3225* (2013.01); *G06F 1/3275* (2013.01); *G06F 3/0653* (2013.01); *G06F 3/0658* (2013.01); *G06F 3/0659* (2013.01); *G06F 3/0679* (2013.01); *G06F 3/0688* (2013.01); *Y02B 60/1246* (2013.01)

(58) Field of Classification Search
CPC .... G06F 1/3225; G06F 1/3268; G06F 1/3275; G06F 3/0625; G06F 3/0653; G06F 3/0658; G06F 3/0659; G06F 3/0679; G06F 3/0688
See application file for complete search history.

(56) References Cited

U.S. PATENT DOCUMENTS

| 8,902,662 | B2 * | 12/2014 | Shiga | G11C 16/10 |
| | | | | 365/185.18 |
| 9,244,519 | B1 * | 1/2016 | Ellis | G06F 13/38 |
| 2012/0023356 | A1 * | 1/2012 | Byom | G11C 5/14 |
| | | | | 713/340 |
| 2012/0331207 | A1 | 12/2012 | Lassa et al. | |

(Continued)

OTHER PUBLICATIONS

International Search Report and Written Opinion in International Application No. PCT/US2015/040165, dated Jan. 10, 2015, 9 pages.

(Continued)

*Primary Examiner* — Dennis M Butler
(74) *Attorney, Agent, or Firm* — Brinks Gilson & Lione

(57) ABSTRACT

A storage module and method are provided for optimized power utilization. In one embodiment, a storage module is provided comprising a storage controller and a plurality of memory dies in communication with the storage controller. The storage controller determines if sufficient power is available to perform an operation on one of the memory dies. In response to determining that sufficient power is not available to perform the operation on one of the memory dies, the storage controller determines if suspending an in-progress operation on another one of the memory dies would provide enough power to perform the operation. In response to determining that suspending the in-progress operation would provide enough power to perform the operation, the storage controller suspends the in-progress operation and performs the operation. Instead of suspending an in-progress operation, the storage controller can instead use a reduced power version of the operation or the in-progress operation.

27 Claims, 7 Drawing Sheets

(56) References Cited

U.S. PATENT DOCUMENTS

2013/0297856 A1 11/2013 Sonoda et al.
2014/0095736 A1 4/2014 Takashi et al.
2014/0293704 A1* 10/2014 Ghalam ................ G11C 16/30
                                                365/185.18

OTHER PUBLICATIONS

International Preliminary Report on Patentability in International Application No. PCT/US2015/040165, dated Feb. 7, 2017, 7 pages.

* cited by examiner

US 9,658,789 B2

STORAGE MODULE AND METHOD FOR OPTIMIZED POWER UTILIZATION

BACKGROUND

Some storage modules, such as a solid-state drive (SSD), contains a plurality of memory dies (e.g., in a multi-die package) that can be read or written in parallel. Such storage modules typically have a maximum power threshold that limits the number of operations that can be executed at any given time. When the actual power consumption is nearing the maximum power threshold, a controller in the storage module can withhold a new operation (e.g., a transfer across the NAND interface and/or a write operation) as to not exceed the limit. Ideally, the actual power consumed in the storage module is equal to the maximum power consumption limit. However, because different operations can consume different amounts of power, the actual power consumed when throttling operations in this way is often less than the maximum power consumption, resulting in inefficient power utilization.

OVERVIEW

Embodiments of the present invention are defined by the claims, and nothing in this section should be taken as a limitation on those claims.

By way of introduction, the below embodiments relate to a storage module and method for optimized power utilization. In one embodiment, a storage module is provided comprising a storage controller and a plurality of memory dies in communication with the storage controller. The storage controller determines if sufficient power is available to perform an operation on one of the memory dies. In response to determining that sufficient power is not available to perform the operation on one of the memory dies, the storage controller determines if suspending an in-progress operation on another one of the memory dies would provide enough power to perform the operation. In response to determining that suspending the in-progress operation would provide enough power to perform the operation, the storage controller suspends the in-progress operation and performs the operation. Instead of suspending an in-progress operation, the storage controller can instead use a reduced power version of the operation or the in-progress operation.

Other embodiments are possible, and each of the embodiments can be used alone or together in combination. Accordingly, various embodiments will now be described with reference to the attached drawings.

DETAILED DESCRIPTION OF THE PRESENTLY PREFERRED EMBODIMENTS

As mentioned in the background section above, withholding a new operation (e.g., a transfer across the NAND interface and/or a write operation) in order to avoid exceeding a maximum power threshold of a storage module is often inefficient, as such throttling often results in consuming far less power than is allowed. The following embodiments can be used to provide a more efficient way of power management. Before turning to these and other embodiments, the following paragraphs provide a discussion of exemplary storage modules that can be used with these embodiments. Of course, these are just examples, and other suitable types of storage modules can be used.

Figure 1:
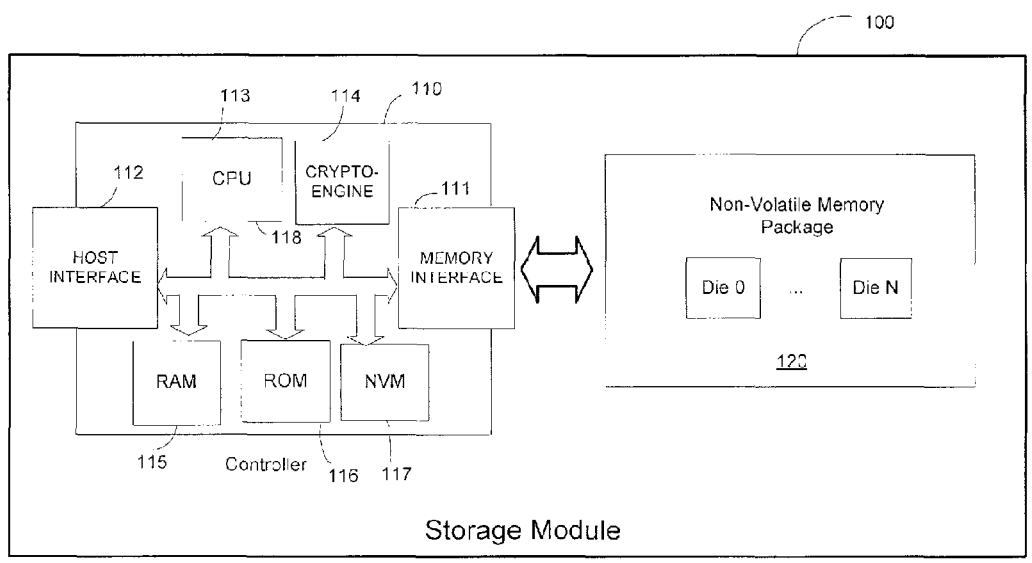
FIG. 1 is a block diagram of an exemplary storage module of an embodiment.

As illustrated in FIG. 1, a storage module 100 of one embodiment comprises a storage controller 110 and a non-volatile memory package 120 containing a plurality of memory dies (Die 0 to Die N). Although only one non-volatile memory package 120 and one memory interface 111 are shown in FIG. 1, it should be understood that the storage module 100 can have more than one non-volatile memory package and/or memory interface 111. The storage controller 110 comprises a memory interface (e.g., a NAND interface) 111 for interfacing with the non-volatile memory package 120 and a host interface 112 for placing the storage module 100 operatively in communication with a host controller. As used herein, the phrase "operatively in communication with" could mean directly in communication with or indirectly in (wired or wireless) communication with through one or more components, which may or may not be shown or described herein.

Figure 2A:
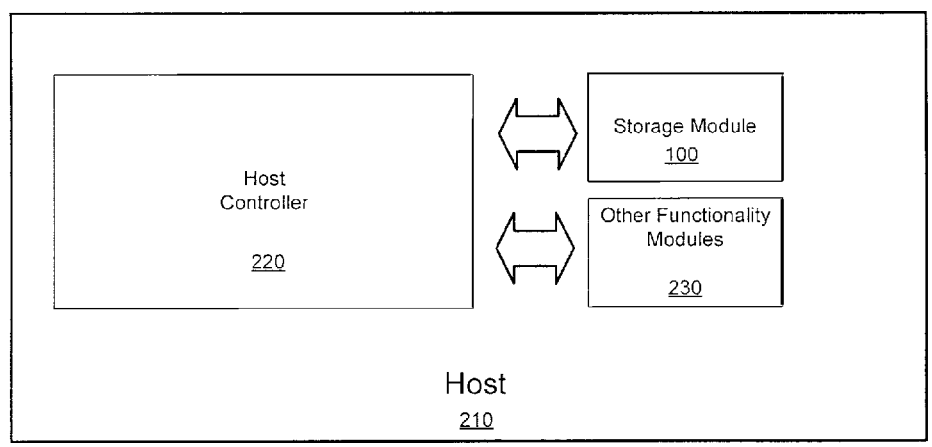
FIG. 2A is a block diagram of a host of an embodiment, where the exemplary storage module of FIG. 1 is embedded in the host.

As shown in FIG. 2A, the storage module 100 can be embedded in a host 210 having a host controller 220. That is, the host 210 embodies the host controller 220 and the storage module 100, such that the host controller 220 interfaces with the embedded storage module 100 to manage its operations. For example, the storage module 100 can take the form of an iNAND™ eSD/eMMC embedded flash drive by SanDisk Corporation, or, more generally, any type of solid state drive (SSD), a hybrid storage device (having both a hard disk drive and a solid state drive), and a memory caching system. The host controller 220 can interface with the embedded storage module 100 using, for example, an eMMC host interface or a UFS interface. The host 210 can take any form, such as, but not limited to, a mobile phone, a tablet computer, a digital media player, a game device, a personal digital assistant (PDA), a mobile (e.g., notebook, laptop) personal computer (PC), or a book reader. As shown in FIG. 2A, the host 210 can include optional other functionality modules 230. For example, if the host 210 is a mobile phone, the other functionality modules 230 can include hardware and/or software components to make and place telephone calls. As another example, if the host 210 has network connectivity capabilities, the other functionality modules 230 can include a network interface. Of course, these are just some examples, and other implementations can be used. Also, the host 210 can include other components (e.g., an audio output, input-output ports, etc.) that are not shown in FIG. 2A to simplify the drawing. It should be noted that while the host controller 220 can control the storage module 100, the storage module 100 can have its own controller to control its internal memory operations. Also, in general, a host controller can be any controller capable of interfacing with the storage module, be it a controller in monolithic form, an entire controller, or a separate functionality module.

Figure 2B:
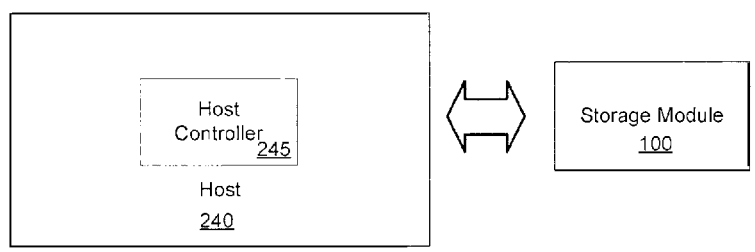
FIG. 2B is a block diagram of the exemplary storage module of FIG. 1 removably connected to a host, where the storage module and host are separable, removable devices.

As shown in FIG. 2B, instead of being an embedded device in a host, the storage module 100 can have physical and electrical connectors that allow the storage module 100 to be removably connected to a host 240 (having a host controller 245) via mating connectors. As such, the storage module 100 is a separate device from (and is not embedded in) the host 240. In this example, the storage module 100 can be a handheld, removable memory device, such as a Secure Digital (SD) memory card, a microSD memory card, a Compact Flash (CF) memory card, a universal serial bus (USB) device (with a USB interface to the host), or a solid-state drive (SSD), and the host 240 is a separate device, such as a mobile phone, a tablet computer, a digital media player, a game device, a personal digital assistant (PDA), a mobile (e.g., notebook, laptop) personal computer (PC), or a book reader, for example.

In FIGS. 2A and 2B, the storage module 100 is in communication with a host controller 220 or host 240 via the host interface 112 shown in FIG. 1. The host interface 112 can take any suitable form, such as, but not limited to, an eMMC host interface, a UFS interface, and a USB interface. The host interface 110 in the storage module 110 conveys memory management commands from the host controller 220 (FIG. 2A) or host 240 (FIG. 2B) to the storage controller 110, and also conveys memory responses from the storage controller 110 to the host controller 220 (FIG. 2A) or host 240 (FIG. 2B). Also, it should be noted that when the storage module 110 is embedded in the host 210, some or all of the functions described herein as being performed by the storage controller 110 in the storage module 100 can instead be performed by the host controller 220.

Returning to FIG. 1, the storage controller 110 comprises a central processing unit (CPU) 113, an optional hardware crypto-engine 114 operative to provide encryption and/or decryption operations, read access memory (RAM) 215, read only memory (ROM) 116 which can store firmware for the basic operations of the storage module 100, and a non-volatile memory (NVM) 117 which can store a device-specific key used for encryption/decryption operations, when used. The storage controller 110 can be implemented in any suitable manner. For example, the storage controller 110 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Suitable controllers can be obtained from SanDisk or other vendors. The storage controller 110 can be configured with hardware and/or software to perform the various functions described below and shown in the flow charts. Also, some of the components shown as being internal to the storage controller 110 can also be stored external to the storage controller 110, and other component can be used. For example, the RAM 115 (or an additional RAM unit) can be located outside of the controller die and used as a page buffer for data read from and/or to be written to the memory package 120.

The memory dies in the non-volatile memory package 120 can also take any suitable form. For example, in one embodiment, one or more of the memory dies take the form of a solid-state (e.g., flash) memory and can be one-time programmable, few-time programmable, or many-time programmable. The memory dies can also use single-level cell (SLC), multiple-level cell (MLC), triple-level cell (TLC), or other memory technologies, now known or later developed. Also, the memory dies can be a two-dimensional memory or a three-dimensional memory.

As mentioned above, the storage module 100 needs to ensure that the actual power consumed is less than a maximum power consumption threshold. To do this, the storage module's controller 110 can project the total power consumption based on operations (e.g., a transfer of data across the memory interface 111, a write operation, a read operation, or an erase operation) to be performed in the memory die(s) of the storage module 100. If the projected consumption is greater than the threshold, can withhold the operation, so it's not performed. However, different operations may consume different amounts of power in an imbalanced fashion. For example, when data is transferred over a NAND interface (for a read or write operation), such transfer can consume 300 mW (or 3 power units) for a relatively short duration. While reads typically are low power and will be assumed to consume 0 power units in this example), a write operation can consume 100 mW (or 1 power unit) for a very long duration. When a storage module, such as an SSD, operates in high parallelism nearing the power limit, this power imbalance can result in inefficient power consumption, as illustrated in the chart in FIG. 3.

Figure 3:
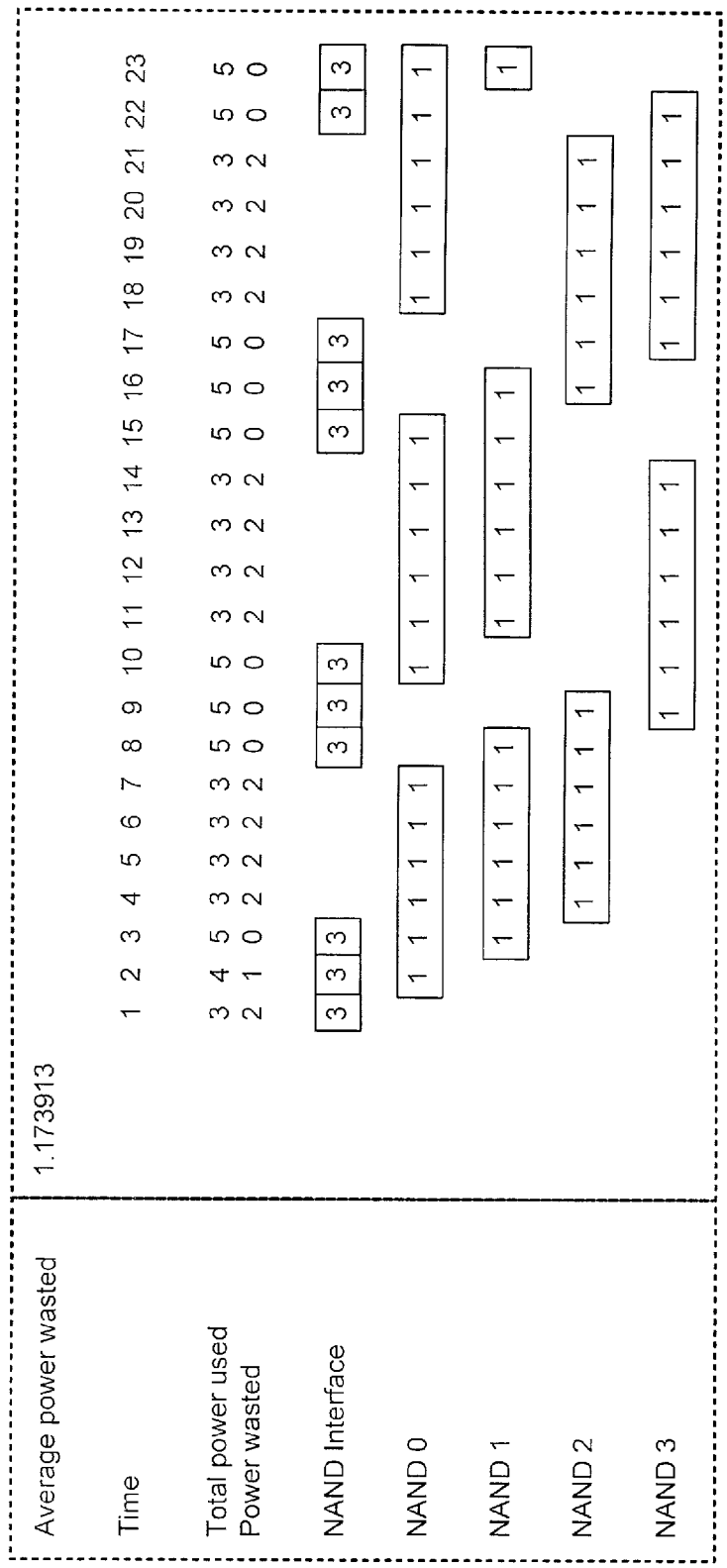
FIG. 3 is a chart showing average power wasted when a throttling operation is used.

FIG. 3 shows an example of power consumption in writing data to a four-die storage module, where the threshold power limit at any given time segment is 5 units. At the start of this write process, three pages of data are sent to the storage module 100 for storage in NAND dies 0, 1, and 2. As shown in FIG. 3, at Time 1, the first page of data is transferred over for 3 power units. As no other operation is occurring at this time, 2 power units are wasted (i.e., the power limit is 5 units, but only 3 units are being used). At Time 2, the first page of data that was received at Time 1 starts to be written in NAND die 0. Writing this page will take 6 time segments, at 1 power unit per time segment. So, writing this page will require 1 power unit in Times 2-7. Similarly, the page of data received at Time 2 will be written in NAND die 1 from Times 3-8, at 1 power unit per time segment. And the page of data received at Time 3 will be written in NAND die 2 from Times 4-9, at 1 power unit per time segment. As shown in the chart, from Time 1 to Time 7, the data transfer and/or write operations take between 3 and 5 power units at any given time segment, leaving 0-2 power units left over at any given time segment. 0-2 power units is not enough power to receive additional pages of data across the memory interface 111, as receiving another page of data requires 3 power units. So, the storage module 100 needs to wait until Time 8 when there will be enough power to receive a new page of data from the controller 110 via the memory interface 111. That is, even though there was left-over power in Times 2-7, that left-over power was not enough to power the interface to either accept new data to be written or send out data read from the memory. This problem propagates throughout the other time segments.

So, in this example, if the storage module 100 operates 3 or more power units from the limit threshold and a NAND transfer operation is pending, then the NAND transfer operation is allowed. However, if less than 3 power units are available, then the NAND transfer operation is withheld until some ongoing operation (e.g. program) finishes and, by that, freeing up 1 power unit to allow the NAND transfer operation to begin. Throttling operations in this way results in operating the storage module 100 1.2 power units below the threshold limit in average, thereby "wasting" 1.2 power units in this example.

To provide a more efficient way of avoiding exceeding a maximum power threshold, the following embodiments can be used to optimize power utilization. In one embodiment, instead of withholding a new operation, the storage module uses a manual suspend/resume feature to control power consumption. This embodiment takes advantage of the fact that when suspending a program operation, the memory die (e.g., NAND) consumes insignificant power; and when resuming the program operation, the memory die resumes from the point it was suspended. According to this embodiment, when a new operation (e.g., a data transfer across the memory interface 111) is requested, provided power limits are met, the storage module 100 can suspend one or more ongoing (e.g., program) operations until there is sufficient power to issue the new operation. After the new operation is completed, the suspended operation(s) can be resumed.

Figure 4:
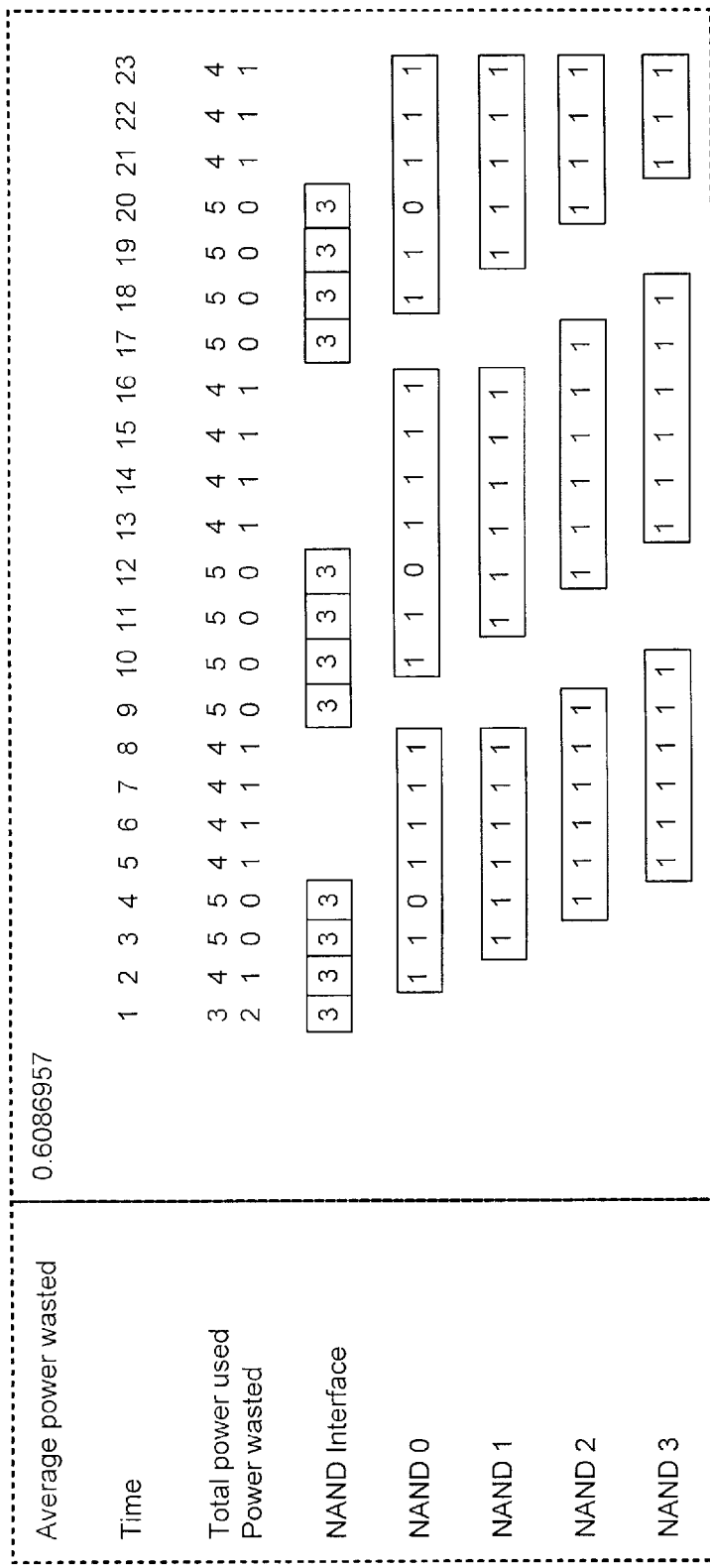
FIG. 4 is a chart showing average power wasted when a method for optimized power utilization of an embodiment is used.

FIG. 4 shows a chart, similar to the one in FIG. 3, to illustrate the power savings offered by this embodiment. In the power-throttling situation shown in FIG. 3, Time 4 had 2 power units left—not enough to power a 3 power-unit interface transfer. In this embodiment, NAND die 0 write operation in Time 4 is suspended (this and other suspended operations are marked in FIG. 4), and the 1 power unit that would have been spent on the write operation instead is used, along with the 2 power units left over, to power the 3 power-unit interface transfer. After that interface transfer is complete, the write operation resumes in Time 5. Although this stretches out the time needed to complete the write operation to NAND die 0 (from 6 time segments in FIG. 3 to 7 time segments in FIG. 4), this embodiment provides more efficient power consumption for the storage module 100 overall (in this example, the power wasted is 0.6 units in average which is improvement of 1 power unit over the non-optimized case in FIG. 3). Thus, by using this embodiment, the storage module 100 can reach higher performance by utilizing power to the fullest extent.

Figure 5:
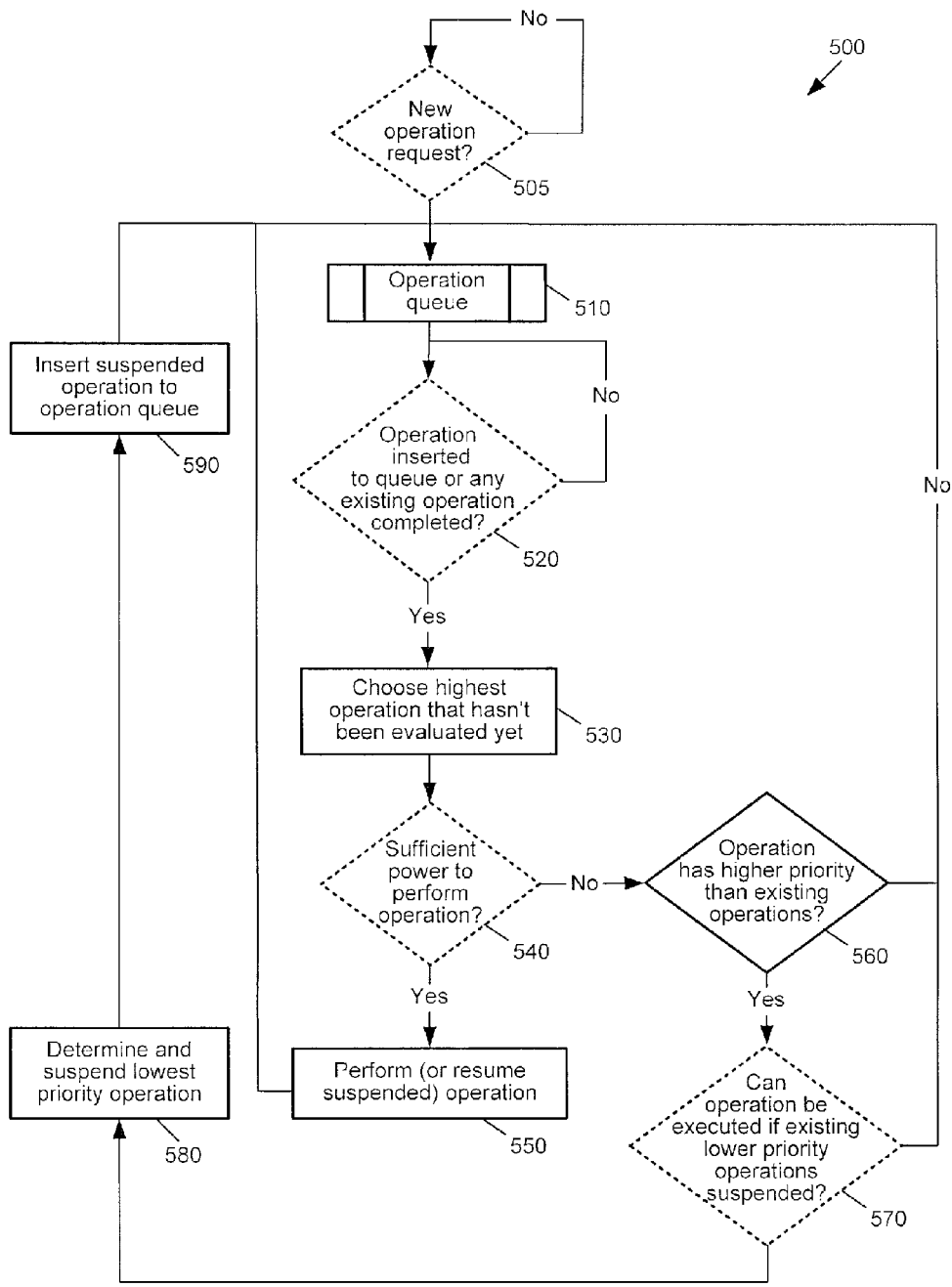
FIG. 5 is a flow chart of a method of an embodiment for optimized power utilization.

This suspend/resume technique can be implemented in any suitable way, and FIG. 5 is a flow chart 500 of one suitable technique, which can be implemented in software and/or hardware of the storage module's controller 110. As shown in the flow chart 500 in FIG. 5, the storage controller 110 decides if a new operation request was received (act 505). If so, the controller 110 adds the new operation request to the operation queue (act 510). The controller 110 then determines if an operation request was inserted into the queue or if any existing operation was completed (act 520). If so, the controller 110 chooses the highest priority operation that has not yet been evaluated yet (act 530) and determines if there is sufficient power to perform that operation (act 540). If there is sufficient power, the controller 110 performs the operation (or resumes the suspended operation) (act 550). If there is not sufficient power, the controller 110 determines if the operation has higher priority than an existing operation (act 560). If it does, the controller 110 determines if the operation can be executed if an existing lower-priority operation is suspended (act 570). If so, the controller 110 determines and suspends the lowest-priority operation (act 580) and inserts the suspended operation in the operation queue (act 590).

Figure 6:
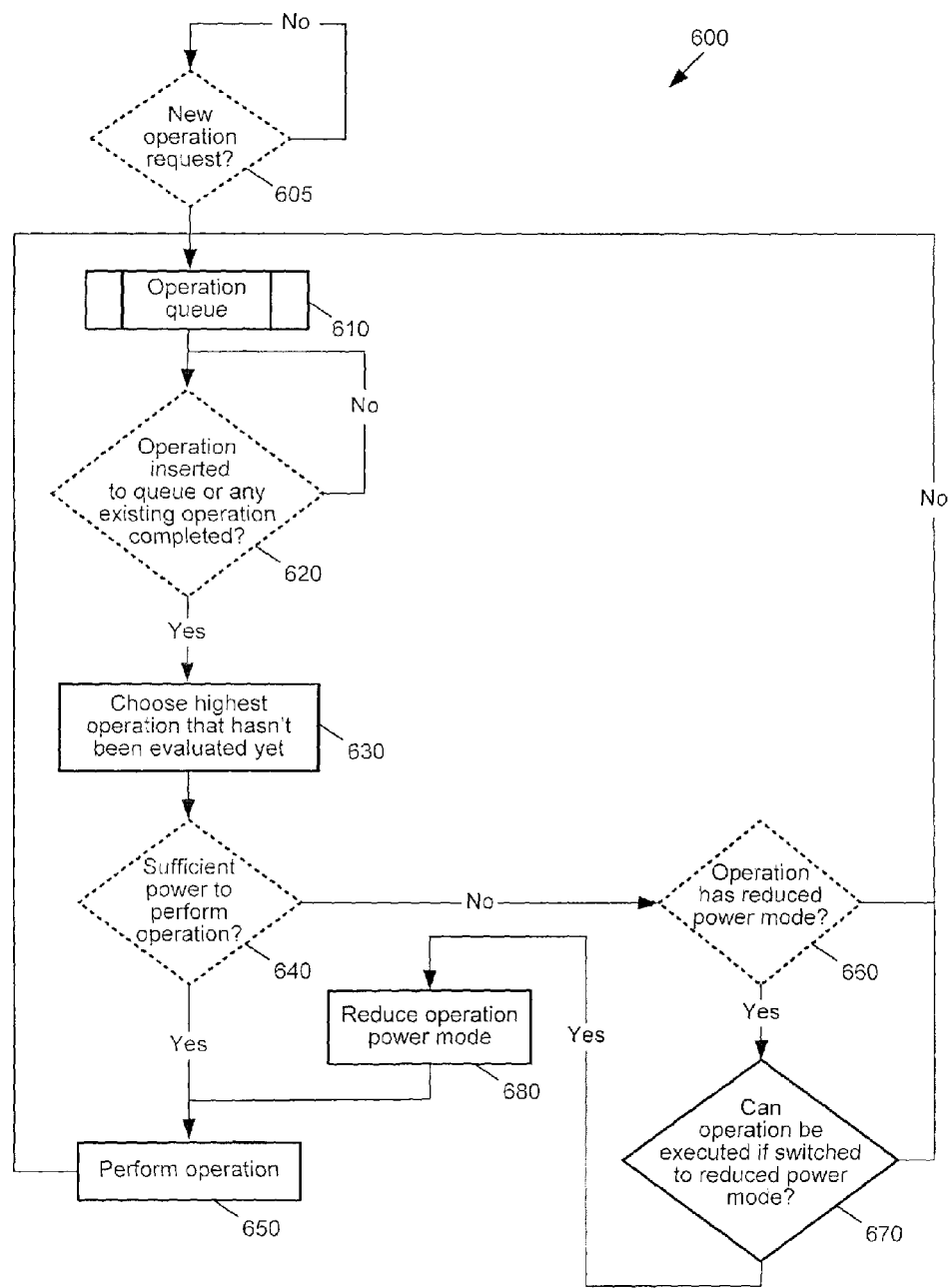
FIG. 6 is a flow chart of a method of an embodiment that uses a reduced power version of a new operation.

There are several alternatives that can be used with these embodiments. For example, instead of suspending/resuming operations, the storage module's controller 110 can instead use a reduced power version of a new operation. For example, if the new operation is a NAND interface transfer which typically runs at toggle mode 200 MHz and consumes 3 power units, there may be a reduced power NAND interface transfer which runs at toggle mode 100 MHz and consumes only 2 power units. If only 2 power units are available, this reduced power NAND interface toggle can be used while the "normal" 3 power unit alternative would have been withheld. FIG. 6 is a flow chart 600 of one exemplary implementation of this alternate embodiment.

As shown in the flow chart 600 in FIG. 6, the controller 110 decides if a new operation request was received (act 605). If so, the controller 110 adds the new operation request to the operation queue (act 610). The controller 110 then determines if an operation request was inserted into the queue or if any existing operation was completed (act 620). If so, the controller 110 chooses the highest priority operation that has not yet been evaluated yet (act 630) and determines if there is sufficient power to perform that operation (act 640). If there is sufficient power, the controller 110 performs the operation (act 650). If there is not sufficient power, the controller 110 determines if the operation has a reduced power mode (act 660). If it does, the controller 110 determines if the operation can be executed if switched to the reduced power version (act 670). If it can, the controller 110 reduces the operation power mode (act 680) and performs the operation (act 650).

Figure 7:
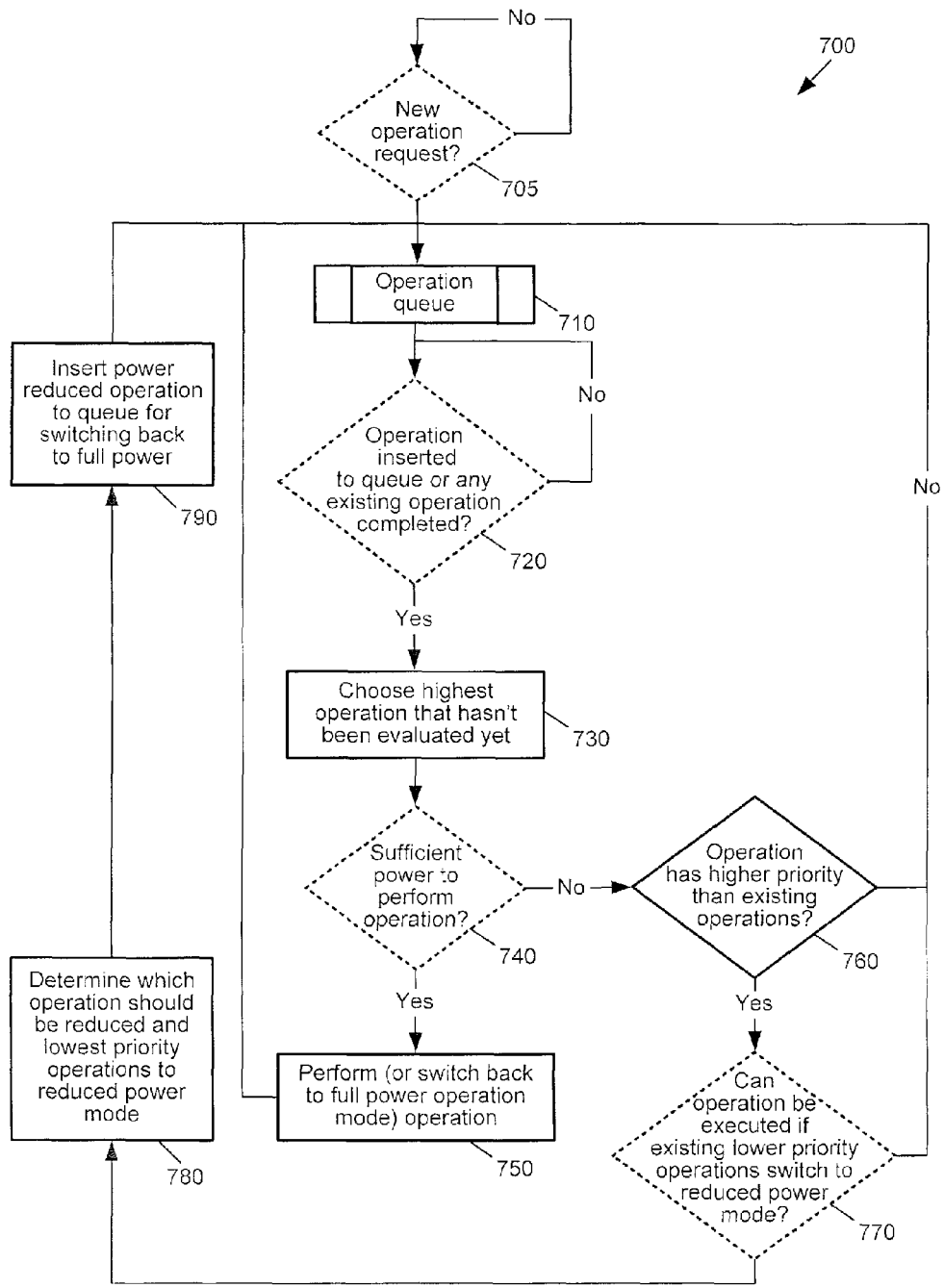
FIG. 7 is a flow chart of a method of an embodiment that uses a reduced power version of an existing operation.

In another alternate embodiment, instead of using a reduced power version of a new operation, the storage module's controller 110 can use a reduced power version of an ongoing operation. For example, if the ongoing operations are NAND program operations which typically consume 1 power unit each, there may be a reduced power NAND program operation which consumes only 0.8 power units (e.g., slower programming). By switching 10 NANDs to this reduce power alternative, 2 power units are redeemed, and the new NAND interface operation can be executed. The reduced power NAND program dies can then be switched back to the normal program mode consuming 1 power unit. FIG. 7 is a flow chart 700 of one exemplary implementation of this alternate embodiment.

As shown in the flow chart 700 in FIG. 7, the controller 110 decides if a new operation request was received (act 705). If so, the controller 110 adds the new operation request to the operation queue (act 710). The controller 110 then determines if an operation request was inserted into the queue or if any existing operation was completed (act 720). If so, the controller 110 chooses the highest priority operation that has not yet been evaluated yet (act 730) and determines if there is sufficient power to perform that operation (act 740). If there is sufficient power, the controller 110 performs the operation (or switches back to a full-power operation mode) (act 750). If there is not sufficient power, the controller 110 determines if the operation has higher priority than an existing operation (act 760). If it does, the controller 110 determines if the operation can be executed if an existing lower-priority operation is switched to a reduced-power mode (act 770). If so, the controller 110 determines which operation should be reduced to the reduced-power mode (act 780). The controller 110 then inserts the reduced operation to the queue for switching back to full power (act 790).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A storage module comprising:
    a plurality of memory dies; and
    a storage controller in communication with the plurality of memory dies, wherein the storage controller is configured to:
        determine if sufficient power is available to perform an operation in one of the memory dies;
        in response to determining that sufficient power is not available to perform the operation in one of the memory dies, determine if suspending an in-progress operation in another one of the memory dies would provide enough power to perform the operation; and
        in response to determining that suspending the in-progress operation would provide enough power to perform the operation, suspend the in-progress operation and perform the operation, wherein the in-progress operation is suspended after it is received from the controller and starts to be performed in the another memory die.

2. The storage module of claim 1, wherein the storage controller is further configured to resume the suspended in-progress operation after the operation has been performed.

3. The storage module of claim 1, wherein the storage controller is further configured to determine if the operation is of higher priority than the in-progress operation, and wherein the in-progress operation is suspended only if the operation is of higher priority than the in-progress operation.

4. The storage module of claim 1, wherein there are a plurality of in-progress operations, and wherein the storage controller is further configured to determine which of the plurality of in-progress operations to suspend based on which of the plurality of in-progress operations is the lower priority.

5. The storage module of claim 1, wherein there are a plurality of operations to be performed, and wherein the storage controller is further configured to determine the operation to perform based on which of the plurality of operations is the highest priority.

6. The storage module of claim 1, wherein the operation or the in-progress operation is one of following: a transfer of data across an interface between the storage controller and one of the memory dies, a write operation, a read operation, and an erase operation.

7. The storage module of claim 1, wherein at least one of the memory dies is a three-dimensional memory.

8. The storage module of claim 1, wherein the storage module is embedded in a host.

9. The storage module of claim 1, wherein the storage module is removably connected to a host.

10. The storage module of claim 1, wherein the storage module is a solid-state drive.

11. A storage module comprising:
    a plurality of memory dies; and
    a storage controller in communication with the plurality of memory dies, wherein the storage controller is configured to:
        determine if sufficient power is available to perform an operation in one of the memory dies;
        in response to determining that sufficient power is not available to perform the operation in one of the memory dies, determine if sufficient power is available to perform a reduced-power-version of the operation;
        in response to determining that sufficient power is available to perform the reduced-power-version of the operation, perform the reduced-power-version of the operation, wherein performing the reduced-power-version of the operation takes more time than performing a full-power version of the operation.

12. The storage module of claim 11, wherein the operation is one of following: a transfer of data across an interface between the storage controller and one of the memory dies, a write operation, a read operation, and an erase operation.

13. The storage module of claim 11, wherein at least one of the memory dies is a three-dimensional memory.

14. The storage module of claim 11, wherein the storage module is embedded in a host.

15. The storage module of claim 11, wherein the storage module is removably connected to a host.

16. The storage module of claim 11, wherein the storage module is a solid-state drive.

17. A storage module comprising:
    a plurality of memory dies; and
    a storage controller in communication with the plurality of memory dies, wherein the storage controller is configured to:
        determine if sufficient power is available to perform an operation in one of the memory dies;
        in response to determining that sufficient power is not available to perform the operation in one of the memory dies, determine if performing a reduced-power-version of an in-progress operation would provide enough power to perform the operation; and
        in response to determining that performing the reduced-power-version of the in-progress operation would provide enough power to perform the operation, perform the reduced-power-version of the in-progress operation, wherein the reduced-power-version of the in-progress operation is performed after the in-progress operation is received from the controller and starts to be performed.

18. The storage module of claim 17, wherein the storage controller is further configured to determine if the operation is of higher priority than the in-progress operation, and wherein the reduced-power-version of the in-progress operation is performed only if the operation is of higher priority than the in-progress operation.

19. The storage module of claim 17, wherein there are a plurality of in-progress operations, and wherein the storage controller is further configured to determine which of the plurality of in-progress operations to perform as a reduced-power version.

20. The storage module of claim 17, wherein there are a plurality of operations to be performed, and wherein the storage controller is further configured to determine the operation to perform based on which of the plurality of operations is the highest priority.

21. The storage module of claim 17, wherein the operation or the in-progress operation is one of following: a transfer of data across an interface between the storage controller and one of the memory dies, a write operation, a read operation, and an erase operation.

22. The storage module of claim 17, wherein at least one of the memory dies is a three-dimensional memory.

23. The storage module of claim 17, wherein the storage module is embedded in a host.

24. The storage module of claim 17, wherein the storage module is removably connected to a host.

25. The storage module of claim 17, wherein the storage module is a solid-state drive.

26. A storage module comprising:
   a plurality of memory dies;
   means for determining if sufficient power is available to perform an operation in one of the memory dies;
   means for, in response to determining that sufficient power is not available to perform the operation in one of the memory dies, determining if suspending an in-progress operation in another one of the memory dies would provide enough power to perform the operation; and
   means for, in response to determining that suspending the in-progress operation would provide enough power to perform the operation, suspending the in-progress operation and perform the operation, wherein the in-progress operation is suspended after it is received from the controller and starts to be performed in the another memory die.

27. The storage module of claim 26, wherein at least one of the means comprises a storage controller.

* * * * *